United States Patent
Song

(10) Patent No.: US 7,233,363 B2
(45) Date of Patent: Jun. 19, 2007

(54) DE-INTERLACING METHOD, APPARATUS, VIDEO DECODER AND REPRODUCING APPARATUS THEREOF

(75) Inventor: Byung-cheol Song, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 433 days.

(21) Appl. No.: 10/870,219

(22) Filed: Jun. 18, 2004

(65) Prior Publication Data

US 2004/0257466 A1 Dec. 23, 2004

(30) Foreign Application Priority Data

Jun. 18, 2003 (KR) .................... 10-2003-0039349

(51) Int. Cl.
 *H04N 7/01* (2006.01)
(52) U.S. Cl. ..................... 348/448; 348/452
(58) Field of Classification Search ............. 348/452, 348/448, 458, 701; 382/107, 199, 299, 300
 See application file for complete search history.

(56) References Cited

U.S. PATENT DOCUMENTS

| 5,689,305 | A | * | 11/1997 | Ng et al. ............... 375/240.15 |
| 5,936,676 | A | | 8/1999 | Ledinh et al. |
| 6,219,464 | B1 | * | 4/2001 | Greggain et al. ........... 382/298 |
| 6,262,773 | B1 | * | 7/2001 | Westerman ................ 348/448 |
| 6,421,090 | B1 | | 7/2002 | Jiang et al. |
| 6,686,923 | B2 | * | 2/2004 | Ji et al. ..................... 345/606 |
| 6,731,342 | B2 | * | 5/2004 | Shin et al. ................. 348/452 |
| 6,757,022 | B2 | * | 6/2004 | Wredenhagen et al. ..... 348/452 |
| 7,023,487 | B1 | * | 4/2006 | Adams ...................... 348/448 |
| 7,075,580 | B2 | * | 7/2006 | Jiang ......................... 348/448 |
| 2002/0080269 | A1 | | 6/2002 | Gotanda et al. |
| 2003/0206667 | A1 | * | 11/2003 | Wang et al. ............... 382/300 |
| 2005/0168631 | A1 | * | 8/2005 | Lufkin ...................... 348/448 |

FOREIGN PATENT DOCUMENTS

| JP | 9-37214 A | 2/1997 |
| JP | 09-200575 A | 7/1997 |
| JP | 2001-352525 A | 12/2001 |
| JP | 2002-185934 A | 6/2002 |
| KR | 2000-046212 A | 7/2000 |
| KR | 2001-073262 A | 1/2001 |
| KR | 2003-010252 A | 2/2003 |

* cited by examiner

*Primary Examiner*—Victor R. Kostak
(74) *Attorney, Agent, or Firm*—Sughrue Mion, PLLC

(57) ABSTRACT

A de-interlacing method and apparatus, and a video decoder and a reproducing apparatus using the de-interlacing method or apparatus are provided. The de-interlacing method includes the steps of: (a) determining an interpolation direction based on a plurality of left and right pixels in left and right pixel columns located at left and right sides of the to-be-interpolated pixel, respectively; and (b) obtaining an interpolated pixel value by performing an interpolation process in a determined interpolation direction. According to the de-interlacing method, it is possible to improve interpolation performance by easily and effectively detecting an edge located in a near-horizontal direction without increasing calculation amount.

22 Claims, 8 Drawing Sheets

⊘ TOP FIELD PIXEL
○ BOTTOM FIELD PIXEL

○ BOTTOM FIELD PIXEL
⊘ TOP FIELD PIXEL

DE-INTERLACING METHOD, APPARATUS, VIDEO DECODER AND REPRODUCING APPARATUS THEREOF

BACKGROUND OF THE INVENTION

This application claims the priority of Korean Patent Application No. 2003-39349, filed on Jun. 18, 2003, in the Korean Intellectual Property Office, the disclosure of which is incorporated herein in its entirety by reference.

1. Field of the Invention

Apparatuses and methods consistent with the present invention relate to a de-interlacing method of converting an interlaced video signal into a progressive video signal, an apparatus therefor, a video decoder, and a reproducing apparatus.

2. Description of the Related Art

In general, a video signal is implemented in an interlaced or progressive format. An interlaced video signal comprises a plurality of fields. A progressive video signal comprises a plurality of frames. One frame can be constructed by alternately inserting one type fields between the other type fields. In comparison with the progressive video signal, the interlaced video signal shows a high quality image with small data size. However, processing for the interlaced video signal is relatively complicated because the interlaced video signal has two types of fields used to display a single image.

On the other hand, when the interlaced video signal is input to a reproducing apparatus, such as a TV, capable of processing the progressive video signal, the interlaced video signal must be converted into the progressive video signal. Such format conversion is called a de-interlacing process, or interlaced-to-progressive conversion (IPC).

The de-interlacing process involves an interpolation process for converting fields of the interlaced video signal into a frame. The interpolation process is mainly classified into a temporal interpolation process and a spatial interpolation process. The temporal interpolation process utilizes an average pixel value of two temporally adjacent pixels. The spatial interpolation process utilizes an average pixel value of two spatially adjacent pixels. In general, the spatial interpolation process is performed under an assumption that spatially adjacent pixels have similar pixel values. As seen in an actual image, pixels near edges, or edge lines, such as a contour of an object, a boundary between an object and background, or a boundary between objects have similar pixel values. However, pixels at both sides of the edge have greatly different pixel values, although the pixels are spatially adjacent to each other. Therefore, if the interpolation process is performed based on only spatial adjacency without consideration of the edges, or the edge direction, the pixel values obtained by the interpolation process will have great errors. It is very important to accurately determine the edge directions in order to improve interpolation quality and reduce interpolation errors.

In a de-interlacing process in the prior art, edge directions are detected in only a limited number of directions, particularly, a vertical direction (90°) and near-vertical directions, and an interpolation process is performed on the detected edge directions. In this case, the edge directions in the vertical and near-vertical directions can be relatively accurately detected. Therefore, a frame obtained by performing the interpolation process on fields having the edges located in the vertical and near-vertical directions has somewhat high quality of image. However, since edges are far away from each other in the horizontal direction and near-horizontal directions, it is relatively difficult to detect the edge directions. Therefore, the frame obtained by performing the interpolation process on fields having the edges located in the horizontal direction and near-horizontal directions has low quality of image due to inaccurate detection of the edge directions. In particular, artifacts due to edges in the near-horizontal directions are more unpleasant to the eye than those in the near-vertical directions.

More particularly, in a conventional method of determining an edge direction, a difference value between pixels in a predetermined number of upper and lower horizontal pixel lines located above and below a to-be-interpolated pixel out of pixels in a field is obtained. Next, if the difference value is less than a predetermined threshold value, the corresponding direction is determined to be an edge direction. However, if the conventional method is applied to determine an edge in near-horizontal directions, an erroneous result may be obtained due to weak pixel correlation. Although a large number of pixels may be used to increase the pixel correlation, errors in the edge detection and calculation amount may increase.

SUMMARY OF THE INVENTION

The present invention provides a de-interlacing method and apparatus, and a video decoder and a reproducing apparatus using the de-interlacing method or apparatus capable of improving interpolation performance by easily and effectively detecting an edge located in a near-horizontal direction.

The present invention also provides a de-interlacing method and apparatus, and a video decoder and a reproducing apparatus using the de-interlacing method or apparatus capable of improving interpolation performance by easily and effectively detecting edges located in a near-horizontal direction as well as a near-vertical direction.

According to an aspect of the present invention, there is provided a de-interlacing method of converting an interlaced video signal into a progressive video signal, the method comprising the steps of: (a) determining an interpolation direction based on a plurality of left and right pixels in left and right pixel columns located at left and right sides of the to-be-interpolated pixel, respectively; and (b) obtaining an interpolated pixel value by performing an interpolation process in a determined interpolation direction.

It is preferable, but not necessary, that the step (a) comprise the steps of: (a1) selecting a plurality of the left and right pixels in a predetermined direction; (a2) calculating a difference value between the selected left and right pixels; and (a3) determining the interpolation direction based on the difference value.

In addition, it is preferable, but not necessary, that the step (a1) be the step of selecting three left and right pixels. In addition, it is preferable, but not necessary, that the step (a2) comprise the steps of: calculating a sum of pixel values of the plurality of left pixels; calculating a sum of pixel values of the plurality of right pixels; and obtaining an absolute difference between the sums of the left and right pixel values as the difference value. In addition, it is preferable, but not necessary, that the step (a3) comprise the step of, if the difference value is equal to or less than a predetermined threshold value, determining the corresponding direction to be the interpolation direction. In addition, it is preferable, but not necessary, that the step (a3) comprise the step of, if the difference value is more than a predetermined threshold value, repeating the steps (a1) and (a2).

In addition, it is preferable, but not necessary, that the step (b) be the step of performing the interpolation process by using a plurality of pixels located at the nearest positions from the to-be-interpolated pixel in the determined interpolation direction. In addition, it is preferable, but not necessary, that the step (b) further comprise the step of determining an average value of pixel values of two pixels adjacent to the to-be-interpolated pixel in the determined interpolation direction to be the interpolated pixel value.

According to another aspect of the present invention, there is provided a de-interlacing apparatus for converting an interlaced video signal into a progressive video signal, the apparatus comprising: a direction determination unit which determines an interpolation direction based on a plurality of left and right pixels in left and right pixel columns located at left and right sides of a to-be-interpolated pixel, respectively; and an interpolator which obtains an interpolated pixel value by performing an interpolation process in the determined interpolation direction.

It is preferable, but not necessary, that the direction determination unit select three left and right pixels. In addition, it is preferable, but not necessary, that the direction determination unit select a plurality of the left and right pixels in a predetermined direction, calculate a difference value between the selected left and right pixels, and determine an interpolation direction based on the difference value. In addition, it is preferable, but not necessary, that the direction determination unit calculate a sum of pixel values of the plurality of left pixels, calculate a sum of pixel values of the plurality of right pixels, and obtain an absolute difference between the sums of the left and right pixel values as the difference value.

In addition, it is preferable, but not necessary, that the interpolator perform the interpolation process by using a plurality of pixels located at the nearest positions from the to-be-interpolated pixel in the determined interpolation direction. In addition, it is preferable, but not necessary, that the interpolator determine an average value of pixel values of two pixels adjacent to the to-be-interpolated pixel in the determined interpolation direction to be the interpolated pixel value.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
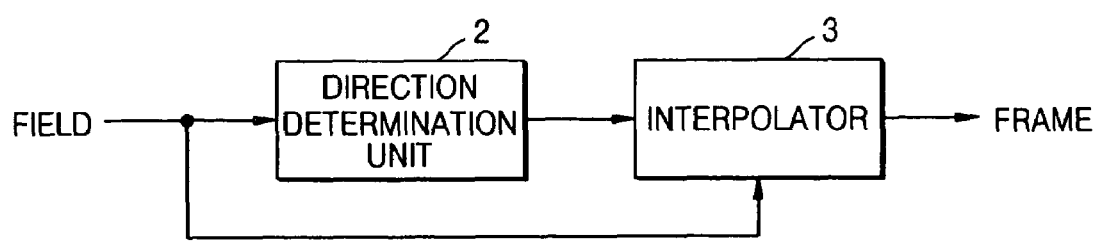
FIG. 1 is a block diagram illustrating a de-interlacing apparatus according to an embodiment of the present invention.

The present invention will now be described more fully with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those skilled in the art. In the drawings, the thicknesses of layers and regions are exaggerated for clarity.

FIG. 1 is a block diagram illustrating a de-interlacing apparatus according to an embodiment of the present invention.

The de-interlacing apparatus comprises a direction determination unit 2 and an interpolator 3, which are used to convert an interlaced video signal into a progressive video signal. The direction determination unit 2 determines an edge direction, that is, an interpolation direction used for an interpolation process. The interpolation direction is determined based on a plurality of left and right pixels in left and right pixel columns located at left and right sides of a to-be-interpolated pixel, respectively. More particularly, a plurality of left and right pixels in one direction out of a plurality of predetermined directions are selected. Difference values between the selected left and right pixels are calculated. The interpolation direction is determined based on the difference values of various directions. The difference value for each of the directions may be a difference between a sum of the left pixels and a sum of the right pixels, or the difference value may be an average of differences between a left pixel and a corresponding right pixel. Alternatively, in calculation of the difference value, weighting factors may be assigned to some of the selected pixels. For example, a higher weighting factor may be assigned to a pixel near the to-be-interpolated pixel.

If one of the difference values is equal to or less than a predetermined threshold value, the corresponding direction is determined to be the interpolation direction, and the direction determination process is ended. If the difference value is more than the predetermined threshold value, next difference value in another direction is calculated and compared with the predetermined threshold value. Until the difference value equal to or less than the predetermined value is detected, the direction determination process is performed. In other words, if the difference value equal to or less than the predetermined value is detected in one direction, the direction determination process is not performed in the remaining directions. If a desired difference value, that is, the difference value equal to or less than the predetermined value, is not detected, a direction corresponding to the smallest difference value is determined to be an interpolation direction.

Alternatively, difference values in a predetermined number of directions for a to-be-interpolated pixel may be sequentially calculated and compared with the predetermined threshold value. If a desired difference value is detected, the corresponding direction is determined to be an interpolation direction. If a desired difference value is not detected, a direction corresponding to the smallest difference value may be determined to be an interpolation direction. Alternatively, all difference values in a predetermined number of directions for a to-be-interpolated pixel may be calculated and compared with the predetermined threshold value. A direction corresponding to the smallest difference value may be determined to be an interpolation direction. In the embodiment of the present invention, the predetermined directions are about +90°, +64°, −64°, +45°, −45°, +34°, −34°, +27°, −27°, +18°, −18°, +14°, and −14°.

Alternatively, pixels in near-horizontal directions are subjected to the direction determination process according to the present invention, and pixels in near-vertical directions are subjected to an interpolation direction determination process in the prior art. In this case, the direction determination process in the directions of about +27°, −27°, +18°, −18°, +14°, and −14° is performed based on the pixels selected according to the present invention, the direction determination process in the directions of about +90°, +64°, −64°, +45°, −45°, +34°, and 34° is performed based on the pixels selected according to the prior art.

The interpolator 3 obtains an interpolated pixel value by performing an interpolation process in the interpolation direction, that is, the edge direction determined by the direction determination unit 2. When all the interpolated pixel values of the to-be-interpolated pixels are obtained, the frame is generated and output by the interpolator 3.

Figure 2:
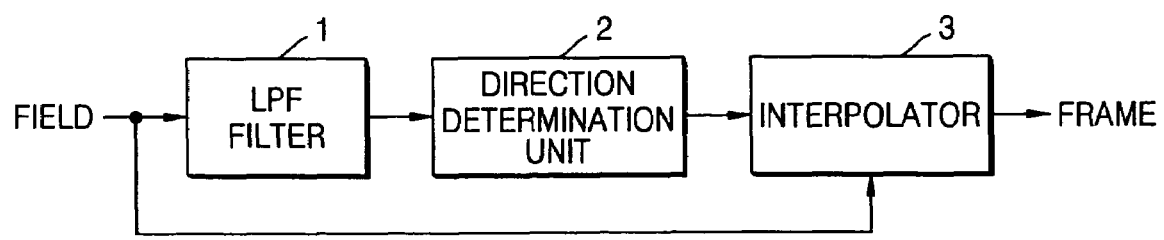
FIG. 2 is a block diagram illustrating a de-interlacing apparatus according to another embodiment of the present invention.

FIG. 2 is a block diagram illustrating a de-interlacing apparatus according to another embodiment of the present invention.

The de-interlacing apparatus according to the embodiment comprises a filter 1, a direction determination unit 2, and an interpolator 3, which are used to convert an interlaced video signal into a progressive video signal. The de-interlacing apparatus of the embodiment of FIG. 2 further comprises the filter 1 in addition to de-interlacing apparatus of the embodiment of FIG. 1. The same reference numerals denote the same elements in the two embodiments and FIGS. 1 and 2.

The filter 1 is a low pass filter for eliminating noise in pixels of input top or bottom fields. Like the embodiment of FIG. 1, the direction determination unit 2 determines an edge direction, that is, an interpolation direction used for an interpolation process. According to the present invention, the interpolation direction is determined based on a plurality of left and right pixels in left and right pixel columns located at left and right sides of a to-be-interpolated pixel, respectively. The interpolator 3 obtains an interpolated pixel value by performing an interpolation process in the interpolation direction, that is, the edge direction determined by the direction determination unit 2. When all the interpolated pixel values of the to-be-interpolated pixels are obtained, the frame is generated and output.

Figure 3:
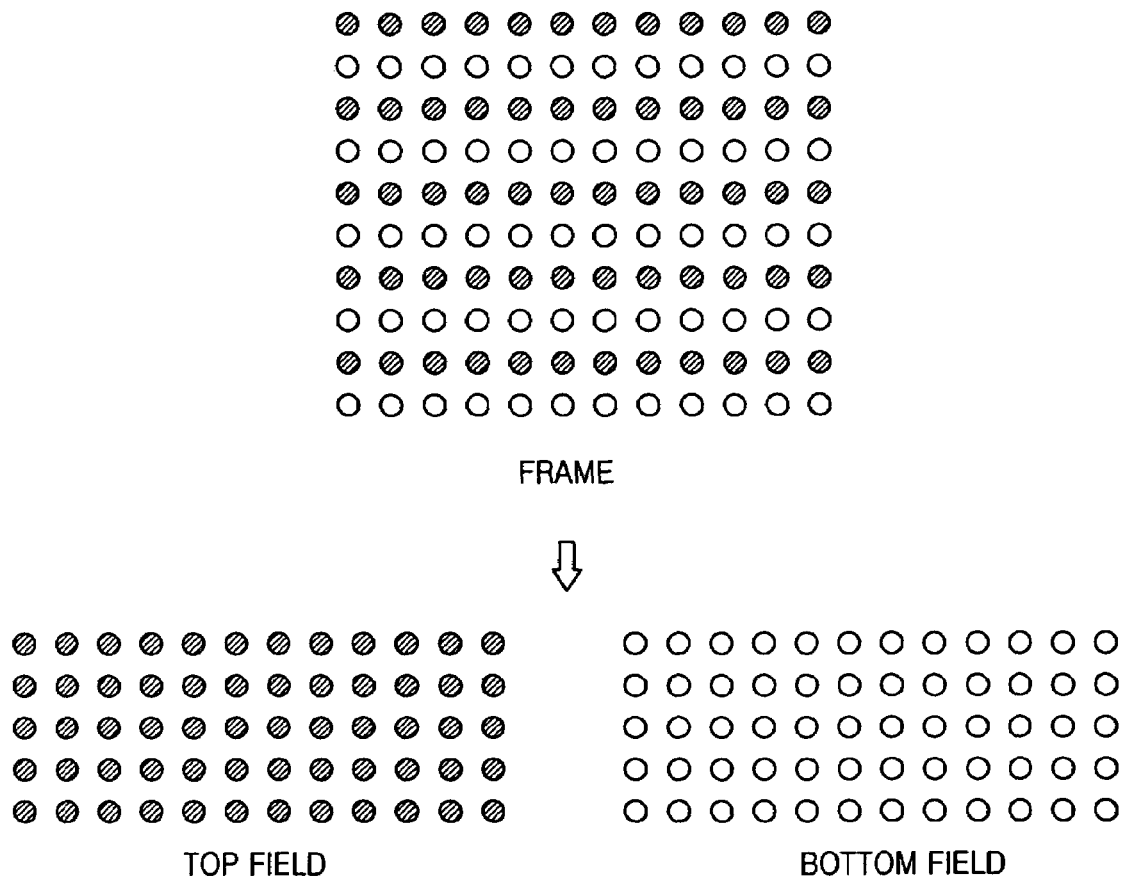
FIG. 3 is a view illustrating a frame and fields.

FIG. 3 is a view illustrating a frame and fields.

A frame is divided into two fields of top and bottom fields. The top field is constructed with odd rows of pixels, and the bottom field is constructed with even rows of pixels. The top and bottom fields are combined together to form the frame. If the frame has p×q pixels, each field has (p/2)×q pixels (p, p/2, and q are integers).

A de-interlacing process is to form a frame by interpolating a top field (bottom field), that is, inserting pixels of a bottom (top) field between pixels of the top (bottom) field.

Figure 4A:
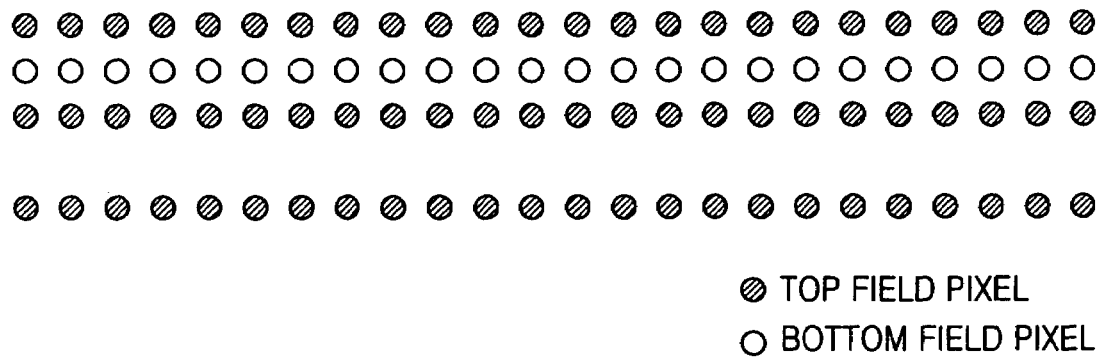
FIGS. 4A and 4B are views illustrating to-be-interpolated pixels used to convert a field into a frame.
Figure 4B:
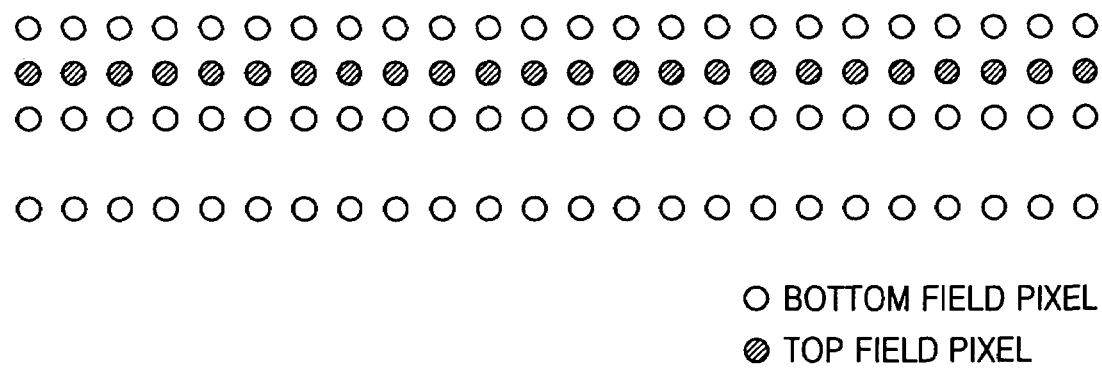

FIGS. 4A and 4B are views illustrating to-be-interpolated pixels used to convert a field into a frame In FIG. 4A, shaded circles denote pixels of the top field, and white circles denote to-be-interpolated pixels which are located at positions of pixels of the bottom field. The frame is obtained when pixel values of all the to-be-interpolated pixels between pixel rows of the top field are obtained. In FIG. 4B, white circles denote pixels of the bottom field, and shaded circles denote to-be-interpolated pixels. The frame is obtained when values of all the to-be-interpolated pixels between pixel rows of the bottom field are obtained.

Figure 5A:
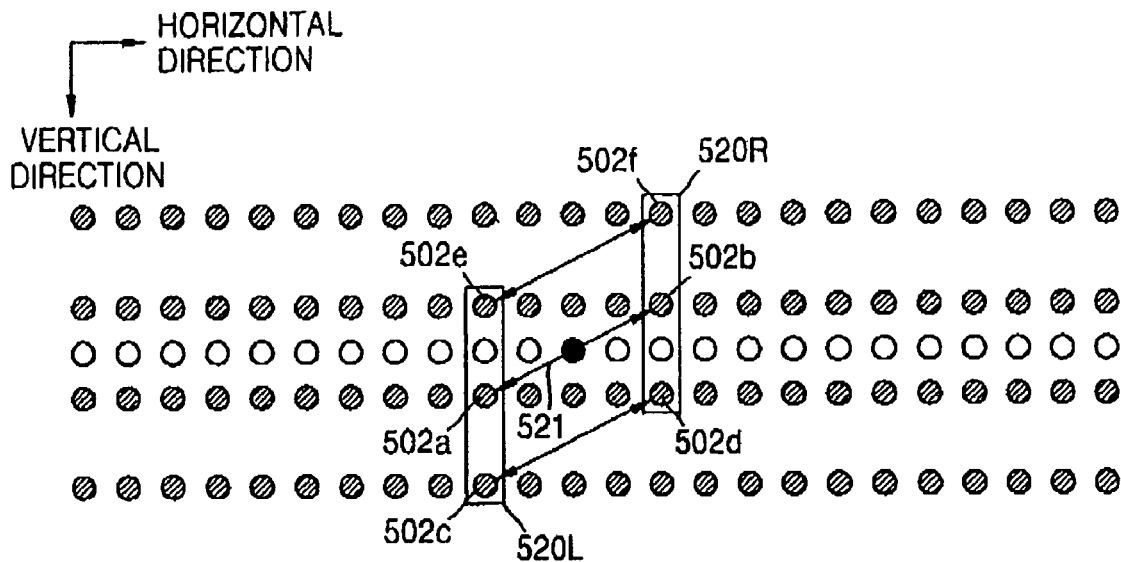
FIGS. 5A to 5C are views for explaining a de-interlacing process according to an embodiment of the present invention.
Figure 5B:
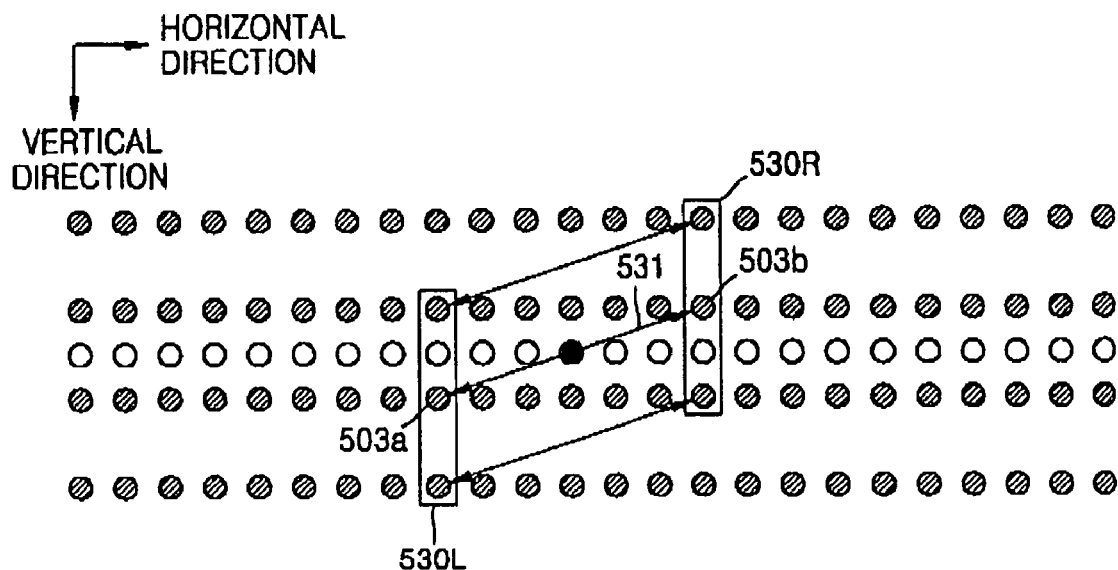
Figure 5C:
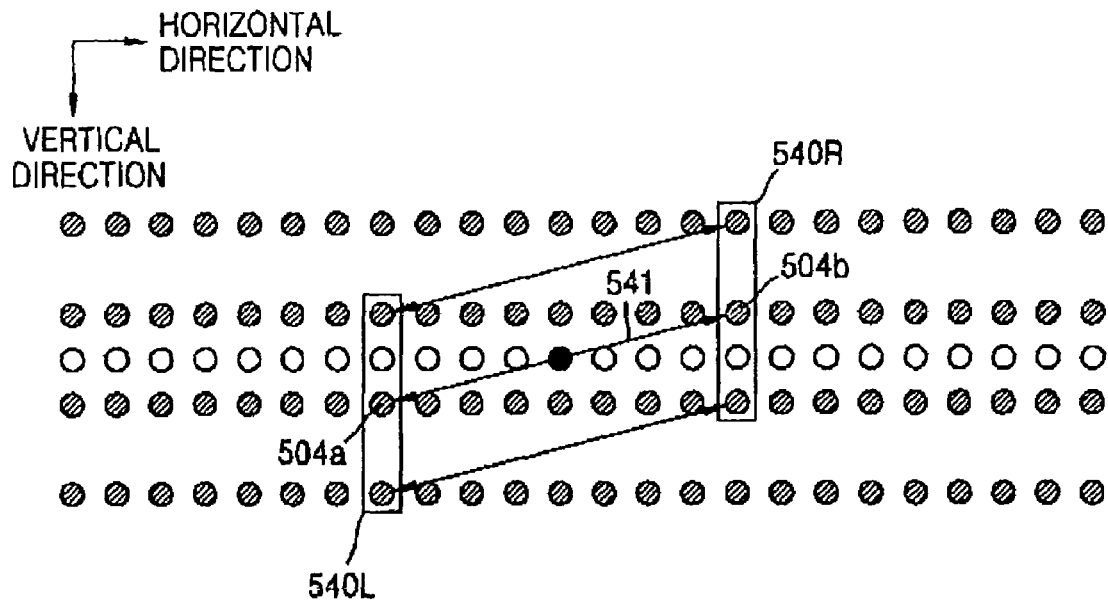

FIGS. 5A to 5C are views for explaining a de-interlacing process according to an embodiment of the present invention In FIGS. 5A to 5C, shaded circles denote pixels of an existing field, white circles denote to-be-interpolated pixels, and a black circle denotes one of the to-be-interpolated pixels currently subjected to an interpolation process, which hereinafter is referred to as a "to-be-interpolated pixel." In order to determine an interpolation direction, three left and right pixels are selected from pixels in left and right pixel columns, which are located at left and right sides of the to-be-interpolated pixel, respectively. Next, each difference value between the left and right pixels is obtained. As described above, the difference value may be a sum or average of differences between the respective left and right pixels.

In FIG. 5A, in order to determine whether or not there is an edge in a direction of about +27°, the three left and right pixels are selected from pixels in left pixel column 520L and right pixel column 520R of the to-be-interpolated pixel, wherein the left and the right pixel columns 520L, 520R each separated by 2 columns from the column wherein the to-be-interpolated pixel is disposed. Similarly, the determination of edge is performed in the direction of about −27°.

In FIG. 5B, in order to determine whether or not there is an edge in a direction of about +18°, the three left and right pixels are selected from pixels in left pixel column 530L and right pixel column 530R of the to-be-interpolated pixel, wherein the left and the right pixel columns 530L, 530R are each separated by 3 columns from the column wherein the to-be-interpolated pixel is disposed. Similarly, the determination of edge is performed in the direction of about −18°.

In FIG. 5C, in order to determine whether or not there is an edge in a direction of about +14°, the three left and right pixels are selected from pixels in left pixel column 540L and right pixel column 540R of the to-be-interpolated pixel, wherein the left and the right pixel columns 540L, 540R are each separated by 4 columns from the column wherein the to-be-interpolated pixel is disposed. Similarly, the determination of edge is performed in the direction of about −14°.

In summary, according to the present invention, in order to determine whether or not there is an edge in near-horizontal directions of about ±27°, ±18°, and ±14°, the pixels are selected as shown in FIGS. 5A to 5C. Next, difference value between the left and right pixels in each of the directions are calculated. For example, in FIG. 5A, the difference value is calculated between the left pixels 502a, 502c, 502e and right pixels 502b, 502d, 502f. The difference value may be calculated by determining the absolute difference between the sum of left pixels 502a, 502c, 502e and a sum of right pixels 502b, 502d, 502f or may be calculated by determining the average of the differences between each one of the left pixels 502a, 502c, 502e and a corresponding one of right pixels 502b, 502d, 502f. If one of the difference values is equal to or less than a predetermined threshold value, the corresponding direction is determined to be an interpolation direction. If two or more difference values are equal to or less than the predetermined threshold value, a direction corresponding to the smallest difference value is determined to be an interpolation direction. If all the difference values are more than the predetermined threshold value, it is determined that there is no edge in the horizontal direction, and the determination of edge is performed in the near-vertical directions.

In an alternative method of determining whether or not there is an edge in a near-horizontal direction, a difference value in one direction of FIGS. 5A to 5C is firstly calculated. If the difference value is equal to or less than a predetermined threshold value, the corresponding direction is determined to be an interpolation direction. If the difference value is more than the predetermined threshold value, the determination of edge is performed in another direction. Until the difference value equal to or less than the predetermined value is detected, the determination of edge is performed. In other words, if the difference value equal to or less than the predetermined value is detected in one direction, the determination of edge is not performed in the remaining directions.

If the difference value equal to or less than the predetermined value is not detected in all the directions, it is determined that there is no edge in the horizontal direction, and the determination of edge is performed in the near-vertical directions. According to an example of the present invention, in order to determine whether or not there is an edge in near-vertical directions of about ±90°, ±64°, ±45°, and ±34°, the pixels are selected in a similar manner shown in FIGS. 5A to 5C. Next, difference values between the left and right pixels in the directions are calculated. The difference values are compared to a predetermined threshold value to determine an interpolation direction.

According to another example of the present invention, in order to determine whether or not there is an edge at a to-be-interpolated pixel, three pixels are sequentially selected in a predetermined number of directions of about +90°, +64°, −64°, +45°, −45°, +34°, 34°, +27°, −27°, +18°, −18°, +14°, and −14°, difference values are sequentially calculated in a similar manner shown in FIGS. 5A to 5C. If a desired difference value, that is, a difference value equal to or less than a predetermined threshold value, is detected, the corresponding direction is determined to be an interpolation direction. If the desired difference value is not detected, a direction corresponding to the smallest difference value is determined to be an interpolation direction.

According to still another example of the present invention, in order to determine whether or not there is an edge at a to-be-interpolated pixel, three pixels are selected in a predetermined number of directions of about +90°, +64°, −64°, +45°, −45°, +34°, 34°, +27°, −27°, +18°, −180°, +14°, and −14°, and all the difference values are calculated in a similar manner shown in FIGS. 5A to 5C. A direction corresponding to the smallest difference value is determined to be an interpolation direction.

After the interpolation direction is determined, an interpolated pixel value is obtained by performing an averaging operation on at least one pair of pixel values located along the interpolation direction at the nearest positions from the to-be-interpolated pixel in the interpolation direction. Specifically, a perpendicular distance from the center of the to-be-interpolated pixel to a line between a pair of pixels determines which pixels are nearest, and hence, at the nearest positions, to the to-be-interpolated pixel, wherein the line is parallel to the interpolation direction. In FIG. 5A, the line 521 between the pair of pixels 502a and 502b is disposed at the center of the to-be-interpolated pixel and thus, the nearest pair of pixels is pixel 502a and pixel 502b. The interpolated pixel value is ((value of pixel 502a)+(value of pixel 502b))/2. In FIG. 5B, the interpolation would be carried out between the value of pixel 503a of column 530L and value of pixel 503b of column 530R. In FIG. 5C, the interpolation would be carried out between the value of pixel 504a of column 540L and the value of pixel 504b of column 540R.

Besides the averaging operation, various methods of calculating the interpolated pixel value disclosed in the prior art may be employed.

Figure 6A:
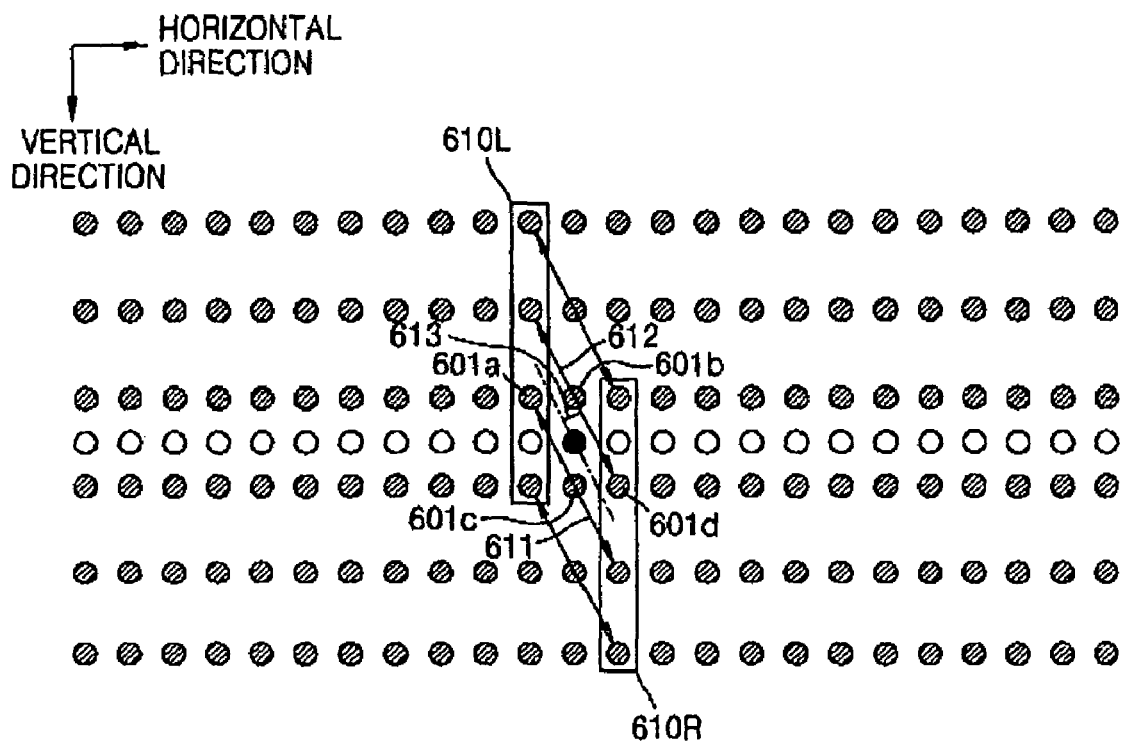
FIGS. 6A to 6C are views for explaining a de-interlacing process according to another embodiment of the present invention.
Figure 6B:
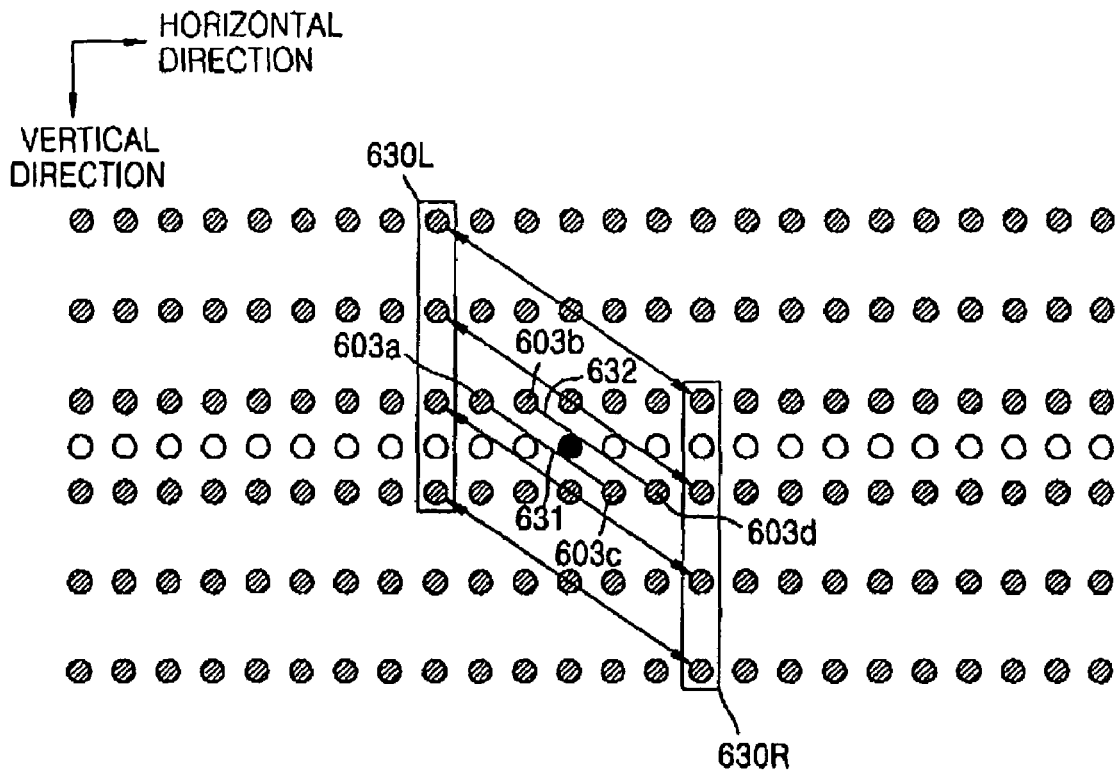
Figure 6C:
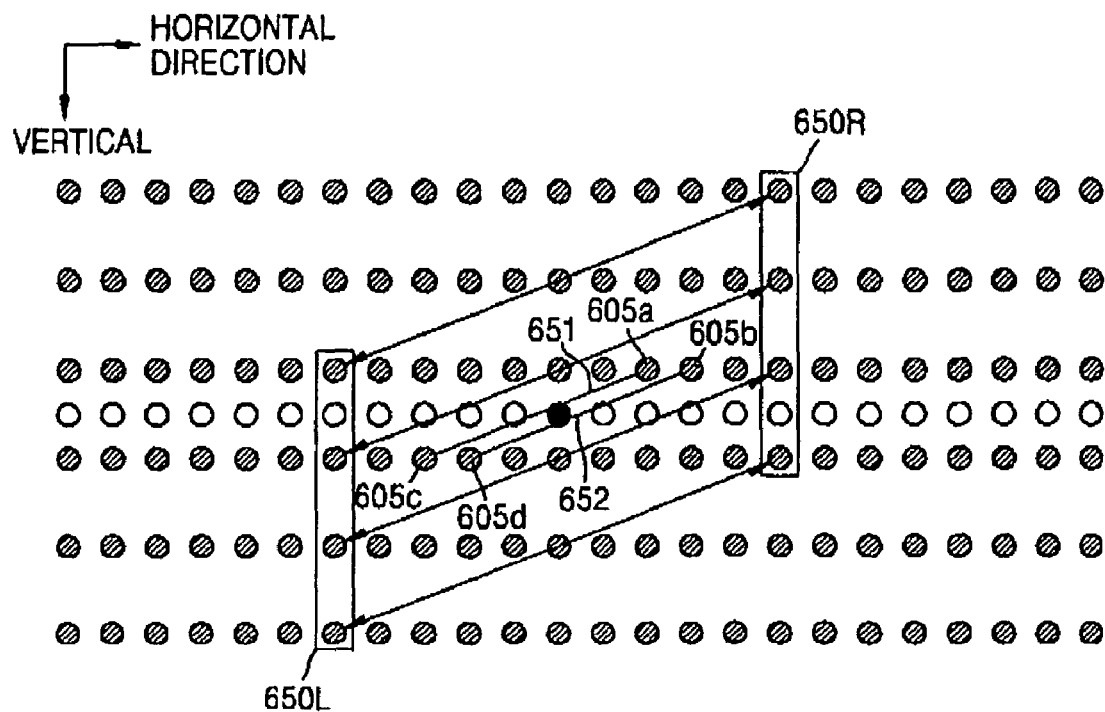

FIGS. 6A to 6C are views for explaining a de-interlacing process according to another embodiment of the present invention.

In FIG. 6A to 6C, shaded circles denote pixels of an existing field, white circles denote to-be-interpolated pixels, and a black circle denotes one of the to-be-interpolated pixels currently subjected to an interpolation process, which, hereinafter, is referred to as "to-be-interpolated pixel," similar to FIG. 5A to 5C. Existing pixels are selected in the same manner as the embodiment of FIGS. 5A and 5C. However, the number of selected pixels is different from that of the embodiment of FIGS. 5A and 5C. In the embodiment, in order to determine an interpolation direction, four left and right pixels are selected from pixels in left pixel column 610L and right pixel column 610R, respectively, which are located at left and right sides of a to-be-interpolated pixel, respectively. Next, each difference value between the left and right pixels is obtained as in FIG. 5A. An interpolation direction is determined based on the difference values. An interpolated value is obtained by performing an interpolation process in the determined interpolation direction. In FIG. 6A, from their respective perpendicular distances, the lines 611 and 612 have the smallest perpendicular distances from the to-be-interpolated pixel (e.g., perpendicular distance 613 for line 612) and thus, pixels 601a, 601b, 601c, and 601d are nearest to the to-be-interpolated pixel. The interpolation process is performed in a direction of about −64°, and the interpolated value is ((value of pixel 601a)+(value of pixel 601b)+(value of pixel 601c)+(value of pixel 601d))/2. Similarly, in FIG. 6B, the interpolation process is performed in a direction of about −34°, for pixels 603a, 603b, 603c, and 603d disposed on lines 631, 632, and the interpolated value is ((value of pixel 603a)+(value of pixel 603b)+(value of pixel 603c)+(value of pixel 603d))/2. In FIG. 6C, the interpolation process is performed for pixels 605a, 605b, 605c, and 605d disposed on lines 651, 652, and the interpolated value is ((value of pixel 605a)+(value of pixel 605b)+(value of pixel 605c)+(value of pixel 605d))/2.

In the embodiment, the meaning of the difference values and the method of determining the interpolation direction based on the difference values are the same as those of the embodiment of FIGS. 5A to 5C.

Now, a de-interlacing method according to the present invention will be described.

Figure 7:
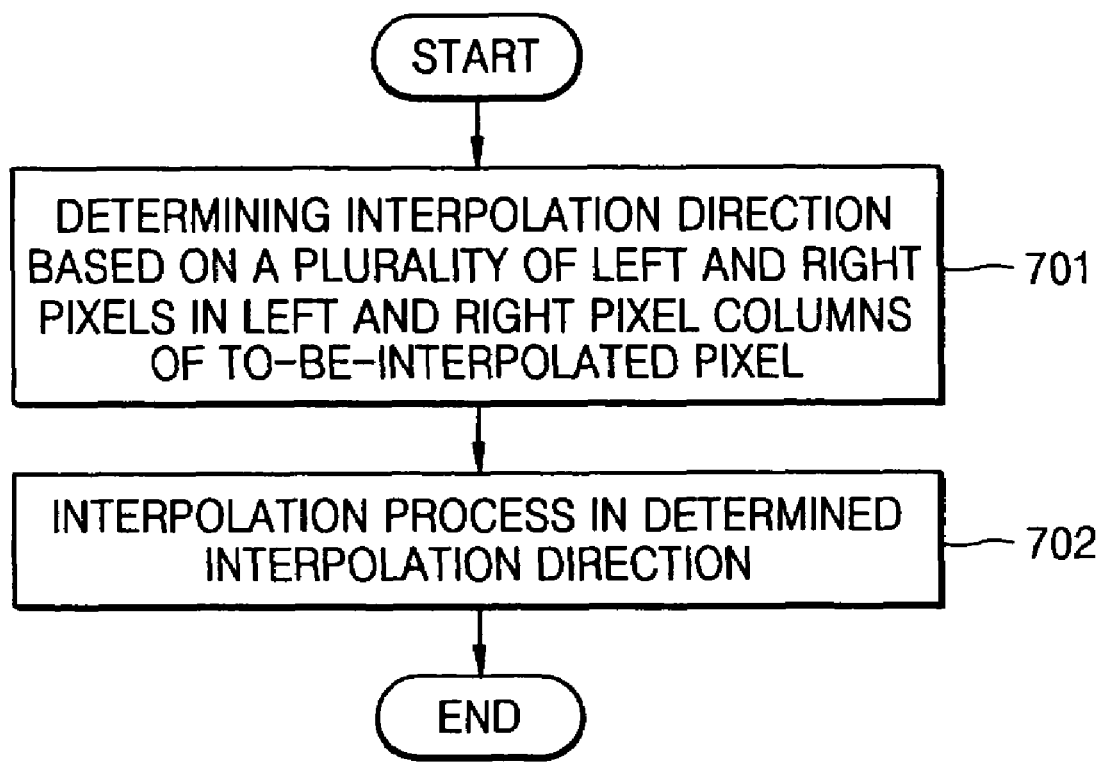
FIG. 7 is a flowchart for explaining a de-interlacing method according to an embodiment of the present invention.

FIG. 7 is a flowchart for explaining a de-interlacing method according to an embodiment of the present invention.

When a top or bottom field to be subjected to a de-interlacing process is input, it is determined whether there is an edge in predetermined directions, for example, near-vertical or near-horizontal directions. Next, in order to perform an interpolation process in a direction where the edge exists, an interpolation direction is determined based on pixels selected in the aforementioned manner according to the present invention (Step 701). As described above, the pixels used to determine the interpolation direction are selected from pixels in left and right pixel columns, which are located at left and right sides of the to-be-interpolated pixel, respectively. Next, an interpolated pixel value is obtained by performing the interpolation process in the interpolation direction (Step 702)

Figure 8:
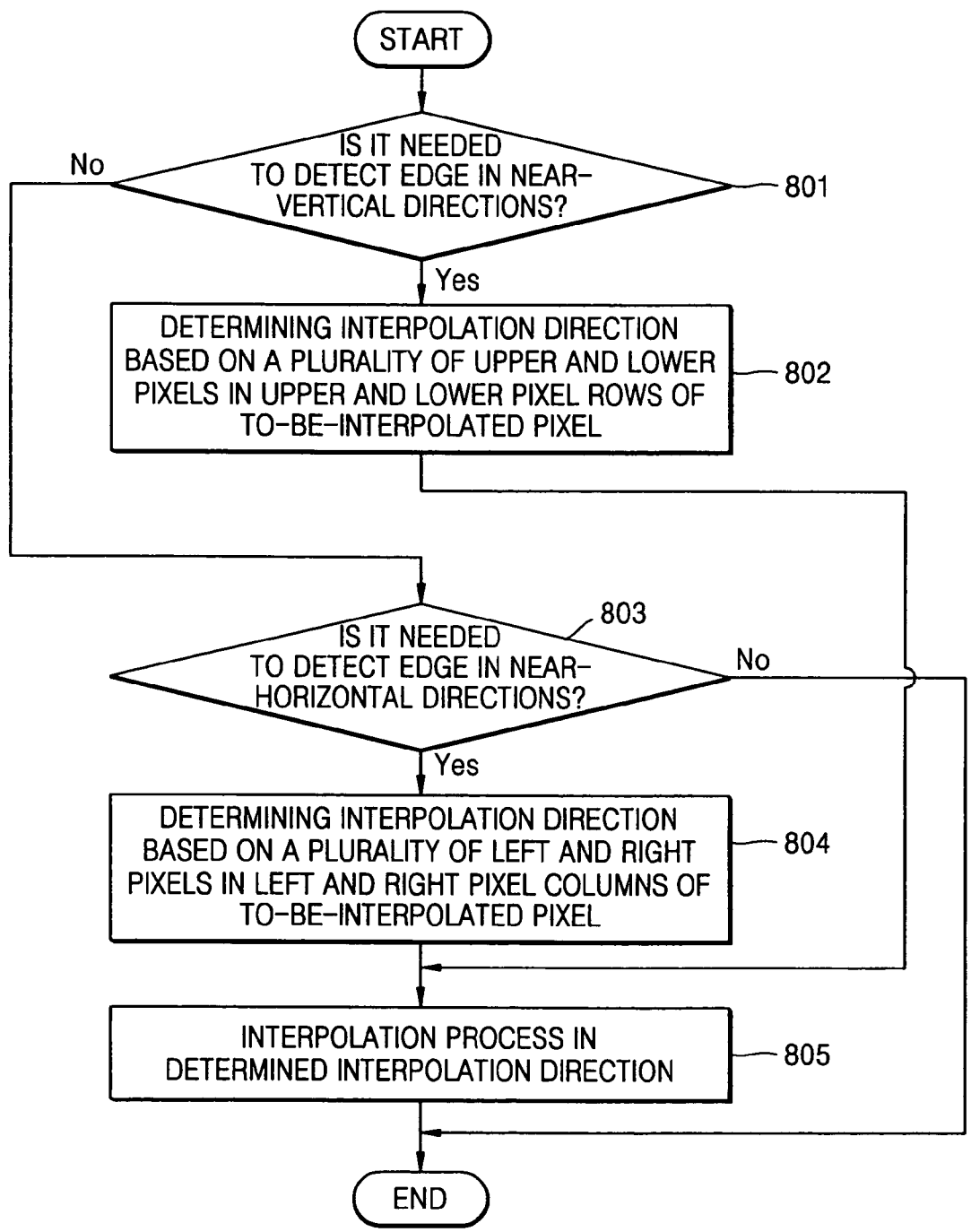
FIG. 8 is a flowchart for explaining a de-interlacing method according to another embodiment of the present invention.

FIG. 8 is a flowchart for explaining a de-interlacing method according to an embodiment of the present invention.

In the embodiment of FIG. 8, pixels used to determine an edge in near-horizontal and near-vertical directions are selected in different manners from the embodiment of FIG. 7. When a top or bottom field is input, it is determined whether it is needed to detect an edge in the near-vertical directions (Step 801). If it is needed to detect the edge in the near-vertical directions, a plurality of upper and lower pixels are selected from pixels in upper and lower pixel rows, which are located above and below a to-be-interpolated pixel, respectively. Next, each difference value between a pair of the selected pixels is calculated. An interpolation direction is determined based on the difference values (Step 802). The calculation of the difference values and the determination of the interpolation direction are performed in the same manner as those of Step 701 in the embodiment of FIG. 7. Next, it is determined whether it is needed to detect an edge in the near-horizontal directions (Step 803). If it is needed to detect the edge in the near-horizontal directions, a plurality of left and right pixels are selected from pixels in left and right pixel column, which are located at left and right sides of the to-be-interpolated pixel, respectively. Next, each difference value between a pair of the selected pixels is calculated. Another interpolation direction is determined based on the difference values (Step 804). An interpolated pixel value is obtained by performing an interpolation process in the interpolation directions (Step 805). Details of the calculation of the interpolated pixel value is the same as those of FIG. 5A to 5C and FIG. 6A to 6C.

On the other hand, a de-interlacing apparatus using a de-interlacing method according to the present invention may be mounted on a video decoder. In addition, the de-interlacing apparatus may be mounted on a reproducing apparatus. In other words, the video decoder and reproducing apparatus are apparatuses where input video signals in an interlaced format are needed to be converted into a video signal in a progressive format.

A de-interlacing method according to the present invention can also be embodied as computer readable codes on a computer readable recording medium. The computer readable recording medium is any data storage device that can store data which can be thereafter read by a computer system. Examples of the computer readable recording medium include magnetic storage devices, optical data storage devices, and carrier waves (such as data transmission through the Internet). The programs, codes, and code segments for accomplishing the present invention can be easily construed by programmers skilled in the art to which the present invention pertains.

According to the present invention, it is possible to easily and effectively detect an edge located in a near-horizontal direction. Therefore, it is possible to improve interpolation performance in a de-interlacing method and apparatus, and in a video decoder and a reproducing apparatus using the de-interlacing method or apparatus. In addition, since an edge located in a near-horizontal direction can be detected by using a few pixels, it is possible to reduce calculation amount in comparison with the prior art.

While the present invention has been particularly shown and described with reference to exemplary embodiments thereof, it will be understood by those skilled in the art that various changes in form and details may be made therein without departing from the spirit and scope of the invention as defined by the appended claims.

What is claimed is:

1. A de-interlacing method of converting an interlaced video signal into a progressive video signal, the method comprising:

determining an interpolation direction based on a plurality of left pixels and a plurality of right pixels respectively in a left pixel column and a right pixel column located at a left side and a right side of a to-be-interpolated pixel, respectively, as a determined interpolation direction, the determining the interpolation direction comprising:
calculating a difference value between the plurality of left pixels and the plurality of right pixels; and
determining the interpolation direction based on the difference value; and
obtaining an interpolated pixel value by performing an interpolation process in the determined interpolation direction.

2. The de-interlacing method according to claim 1, wherein the operation of determining the interpolation direction further comprises:
selecting the plurality of the left and the plurality of the right pixels in a predetermined direction to generate selected left pixels and selected right pixels; and
calculating the difference value between the selected left and right pixels.

3. A de-interlacing method of converting an interlaced video signal into a progressive video signal, the method comprising:
determining an interpolation direction based on a plurality of left pixels and a plurality of right pixels respectively in a left pixel column and a right pixel column located at a left side and a right side of a to-be-interpolated pixel, respectively, as a determined interpolation direction; and
obtaining an interpolated pixel value by performing an interpolation process in the determined interpolation direction,
wherein the operation of selecting comprises selecting three left pixels and three right pixels.

4. The de-interlacing method according to claim 1, wherein the operation of calculating the difference value comprises:
calculating a first sum of pixel values of the plurality of left pixels;
calculating a second sum of pixel values of the plurality of right pixels; and
obtaining an absolute difference between the first and the second sums as the difference value.

5. The de-interlacing method according to claim 1, wherein the operation of determining the interpolation direction comprises, if a difference value of a first direction is equal to or less than a predetermined threshold value, determining the first direction to be the interpolation direction.

6. The de-interlacing method according to claim 1, wherein the operation of determining the interpolation direction comprises, if the difference value is more than a predetermined threshold value, repeating the operations of determining the interpolation direction and the operation of calculating the difference value.

7. The de-interlacing method according to claim 1, wherein the operation of determining the interpolation direction is performed in order to detect an edge in near-horizontal directions.

8. The de-interlacing method according to claim 7, wherein the operation of determining the interpolation direction is based on a plurality of upper and lower pixels in upper and lower pixel rows located above and below the to-be-interpolated pixel, respectively, in order to detect an edge in near-vertical directions.

9. The de-interlacing method according to claim 1, wherein the operation of obtaining an interpolated pixel comprises performing the interpolation process by using a plurality of pixels located at nearest positions from the to-be-interpolated pixel in the determined interpolation direction.

10. The de-interlacing method according to claim 1, wherein the operation of obtaining the interpolated pixel comprises determining an average value of pixel values of two pixels adjacent to the to-be-interpolated pixel in the determined interpolation direction to be the interpolated pixel value.

11. A de-interlacing apparatus for converting an interlaced video signal into a progressive video signal, the apparatus comprising:
   a direction determination unit which determines an interpolation direction as a determined interpolation direction based on a plurality of left pixels and a plurality of right pixels respectively in a left pixel column and a right pixel column located at a left side and a right side of the to-be-interpolated pixel, respectively, calculates a difference value between the plurality of left pixels and the plurality of right pixels, and determines the interpolation direction based on the difference value; and
   an interpolator which obtains an interpolated pixel value by performing an interpolation process in the determined interpolation direction.

12. A de-interlacing apparatus for converting an interlaced video signal into a progressive video signal, the apparatus comprising:
   a direction determination unit which determines an interpolation direction as a determined interpolation direction based on a plurality of left pixels and a plurality of right pixels respectively in a left pixel column and a right pixel column located at a left side and a right side of the to-be-interpolated pixel, respectively; and
   an interpolator which obtains an interpolated pixel value by performing an interpolation process in the determined interpolation direction,
   wherein the direction determination unit selects three left pixels and three right pixels.

13. The de-interlacing apparatus according to claim 11, wherein the direction determination unit selects the plurality of left pixels and the plurality of the right pixels in a predetermined direction as selected left pixels and selected right pixels, calculates the difference value between the selected left and right pixels.

14. A de-interlacing apparatus for converting an interlaced video signal into a progressive video signal, the apparatus comprising:
   a direction determination unit which determines an interpolation direction as a determined interpolation direction based on a plurality of left pixels and a plurality of right pixels respectively in a left pixel column and a right pixel column located at a left side and a right side of the to-be-interpolated pixel, respectively; and
   an interpolator which obtains an interpolated pixel value by performing an interpolation process in the determined interpolation direction,
   wherein the direction determination unit calculates a first sum of pixel values of the plurality of left pixels, calculates a second sum of pixel values of the plurality of right pixels, and obtains an absolute difference between the first and the second sums as the difference value.

15. The de-interlacing apparatus according to claim 11, wherein the interpolator performs the interpolation process by using a plurality of pixels located at nearest positions from the to-be-interpolated pixel in the determined interpolation direction.

16. The de-interlacing apparatus according to claim 11, wherein the interpolator determines an average value of pixel values of two pixels adjacent to the to-be-interpolated pixel in the determined interpolation direction to be the interpolated pixel value.

17. A de-interlacing apparatus according to claim 11, wherein the direction determination unit determines a plurality of interpolation directions respectively for a plurality of to-be-interpolated pixels in order to convert a field into a frame.

18. A video decoder comprising a de-interlacing apparatus of claim 11.

19. A reproducing apparatus comprising a de-interlacing apparatus of claim 11.

20. A de-interlacing method, the method comprising:
   determining an interpolation direction based on at least three left pixels and at least three right pixels respectively in a left pixel column and a right pixel column located at a left side and a right side of a to-be-interpolated pixel, respectively, as a determined interpolation direction; and
   obtaining an interpolated pixel value by performing an interpolation process in the determined interpolation direction.

21. A de-interlacing method of converting an interlaced video signal into a progressive video signal, the method comprising:
   determining an interpolation direction based on a plurality of left pixels and a plurality of right pixels respectively in a left pixel column and a right pixel column located at a left side and a right side of a to-be-interpolated pixel, respectively, as a determined interpolation direction, the determining the interpolation direction comprising:
      selecting the plurality of the left and the plurality of the right pixels in a predetermined direction to generate selected left pixels and selected right pixels; and
      calculating a difference value between the selected left and right pixels; and
   obtaining an interpolated pixel value by performing an interpolation process in the determined interpolation direction.

22. A de-interlacing apparatus for converting an interlaced video signal into a progressive video signal, the apparatus comprising:
   a direction determination unit which determines an interpolation direction as a determined interpolation direction based on a plurality of left pixels and a plurality of right pixels respectively in a left pixel column and a right pixel column located at a left side and a right side of the to-be-interpolated pixel, respectively, selects the plurality of left pixels and the plurality of the right pixels in a predetermined direction as selected left pixels and selected right pixels, calculates a difference value between the selected left and right pixels; and
   an interpolator which obtains an interpolated pixel value by performing an interpolation process in the determined interpolation direction.

* * * * *